UNITED STATES PATENT OFFICE.

GUSTAV H. LIEBAU, OF METUCHEN, NEW JERSEY, ASSIGNOR OF ONE-FOURTH TO CHARLES A. WANNER, OF MELROSE PARK, PENNSYLVANIA, AND ONE-FOURTH TO JOHN A. STAHR, OF ELKINS PARK, PENNSYLVANIA.

MAKING CEMENT STRUCTURES WATERPROOF.

No. 825,846.     Specification of Letters Patent.     Patented July 10, 1906.

Application filed December 22, 1905. Serial No. 293,037.

*To all whom it may concern:*

Be it known that I, GUSTAV H. LIEBAU, a citizen of the United States, residing at Metuchen, Middlesex county, New Jersey, have invented certain Improvements in Making Cement Structures Waterproof, of which the following is a specification.

The object of my invention is to make cement substantially waterproof. This object I attain in the following manner:

In carrying out my invention I can use any of the cements now on the market, preferably "Portland," and mix them in the ordinary manner with the varied quantities of sand, as desired; but in place of the water usually added to the cement to make the mortar I use a compound of which water forms the main ingredient.

In making this compound I mix a certain quantity of silicate of soda, a certain quantity of a non-drying oil, such as fish-oil, or preferably whale-oil, and a certain quantity of water.

In carrying out my experiments I have found that a very acceptable compound can be made with one-half gallon of silicate of soda, one-half gallon of whale-oil, mixed with thirty gallons of water. These ingredients can be thoroughly mixed and barreled, so that when it is wished to make a cement structure waterproof the compound is added to the cement and sand in the place of water. If desired, the silicate of soda and whale-oil can be mixed in equal proportions and barreled and the water added when the compound is mixed with the cement.

I find that it is desirable to cleanse the sand, preferably by washing, so that the surface of the small particles thereof will be thoroughly coated with the compound. The silicate of the compound combines with the silica in the cement, and the whale-oil, having the quality of not drying out, fills the small interstices or voids of the mass in such a manner as to make the structure impervious to moisture.

The soda of the silicate of soda will not sweat out and is not objectionable in the cement structure, as the whale-oil will combine with the soda, forming a jelly which will be retained in the structure.

In the ordinary cement structure made without the use of my ingredients there are always found numerous hair cracks and checks; but owing to the fact that the fish-oil never dries out these small hair cracks and checks are prevented by the use of my invention.

To produce the best results, the materials must be so thoroughly mixed that the oil will envelop every molecule of cement. The silicate of soda of the compound initiates the crystallization of the silicate in the cement, thus making a very substantial and waterproof structure.

I have found that while by the use of my improved compound the setting of the cement is retarded to a certain extent it will not, however, affect the solidity or strength of the structure to any material degree.

I claim—

1. A compound consisting of concrete, silicate of soda and whale-oil.

2. The combination of cement with silicate of soda and whale-oil.

3. A compound consisting of concrete, silicate of soda and a non-drying oil.

4. A cement structure consisting of cement, silicate of soda and a non-drying oil, the two latter substances being uniformly distributed throughout the structure.

In testimony whereof I have signed my name to this specification in the presence of two subscribing witnesses.

GUSTAV H. LIEBAU.

Witnesses:
   WILL. A. BARR,
   JOS. H. KLEIN.